INVENTOR
EDWARD J. FALK
BY
Joseph E. Papin

United States Patent Office 3,669,505
Patented June 13, 1972

---

3,669,505
CONTROL VALVE AND SYSTEM
Edward J. Falk, St. Louis, Mo., assignor to Wagner Electric Corporation, Newark, N.J.
Filed Apr. 28, 1970, Ser. No. 32,584
Int. Cl. B60t 17/22, 8/26
U.S. Cl. 303—6 C      15 Claims

ABSTRACT OF THE DISCLOSURE

A control valve is provided in a horizontally split brake system having separate fluid pressure supplies wherein at least one brake of the front and rear brake sets is connected in each system, and said control valve includes separate spring-loaded proportioning pistons generally operable in said systems in response to a predetermined value of the fluid pressures supplied thereto from said fluid pressure supplies to thereafter proportion the fluid pressures applied to the rear brakes. Upon the failure of one system, the proportioning piston of the other or operating system is operable not only against its spring load but also against the spring load of the proportioning piston in the failed one system to increase the predetermined value of the supplied fluid pressure at which the proportioning actuation thereof is effected.

---

This invention relates to horizontally split brake systems and in particular to a control valve for controlling pressure fluid flow to one of the front and rear brake sets thereof.

In the past, control valves were utilized in horizontally split braking systems, and said control valves were provided with separate proportioning piston means generally operable in said systems in response to a predetermined value of the separate fluid pressures supplied thereto from separate fluid pressure supplies to thereafter effect proportional applications of fluid pressures to the vehicle rear brakes. In the event of the failure of one of the systems, some of the past control valves were effective to by-pass the proportioning valve means of the other or operating system in order to utilize the maximum fluid pressure available therein to energize the rear brakes, as shown in U.S. Pat. No. 3,450,443 issued to Richard C. Bueler on June 17, 1969. Of course, one of the disadvantageous or undesirable features of such past control valves and systems was that the by-passing of the proportioning piston means in the operative system completely obviated controllability of the pressure fluid flow to the rear brakes thereby increasing the tendency for rear brake lock-up. In other past control valves, the proportioning piston means was actuated in its usual manner to effect the proportional application in excess of the predetermined value upon the failure of one of the systems, and one of the disadvantageous or undesirable features of such other past control valves and systems was that the proportional application of fluid pressure to the rear brakes occurred at the same predetermined value regardless of whether one or both systems were operative.

The principal object of the present invention is to provide a control valve in a horizontally split brake system which obviates or overcomes the aforementioned disadvantageous or undesirable features of the past control valves and systems, and this, as well as other objects and advantageous features of the present invention, will become apparent hereinafter.

Briefly, one aspect of the present invention includes a horizontally split brake system having separate fluid pressure supplies wherein at least one brake of the front and rear brakes is connected in each system, and a control valve connected in said systems having separate proportioning means therein normally responsive to predetermined values of the supplied fluid pressures to effect a proportioned application thereof to the rear brakes in said systems, ons of said proportioning means being actuated in response to another predetermined value in excess of the first named predetermined value upon the failure of one of said systems.

In the drawings which illustrate embodiments of the invention,

Figure 1:
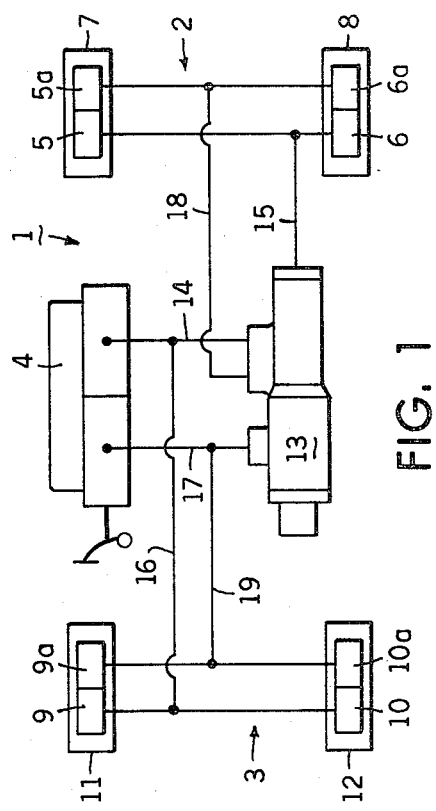
FIG. 1 is a schematic diagram of the brake systems of the present invention.

Referring now to the drawings and in particular to FIG. 1, a horizontally split fluid pressure system 1 is provided with separate branches 2, 3 connected between separate fluid pressure generating chambers (not shown) of a tandem or split system master cylinder 4 and between fluid pressure responsive motors or split wheel cylinders 5, 5a and 6, 6a of the vehicle front axle set of friction devices or brakes 7, 8 and fluid pressure responsive motors or split wheel cylinders 9, 9a, and 10, 10a of the rear axle set of friction devices or brakes 11, 12, and a control valve 13 is interposed in said branches. In the system branch 2, a conduit 14 is connected between one fluid pressure generating chamber of the split master cylinder 4 and an inlet port of the control valve 13, and a conduit 15 has one end connected with an outlet port of said control valve while the other end thereof branches for connection with the split wheel cylinders 5, 6 of the front brakes 7, 8. Another conduit 16 has one end intersecting with the conduit 14 while the other end thereof branches for connection with the split wheel cylinders 9, 10 of the rear brakes 11, 12. In the system branch 3, a conduit 17 is connected between the other fluid pressure generating chamber of the split master cylinder 4 and another inlet port of the control valve 13, and another conduit 18 has one end connected with another outlet port of said control valve while the other end thereof branches for connection with the split wheel cylinders 5a, 6a of the front brakes 7, 8. To complete the description of the system 1, another conduit 19 has one end intersecting with the conduit 17 while the other end thereof branches to connect with the split wheel cylinders 9a, 10a of the rear brakes 11, 12.

Figure 2:
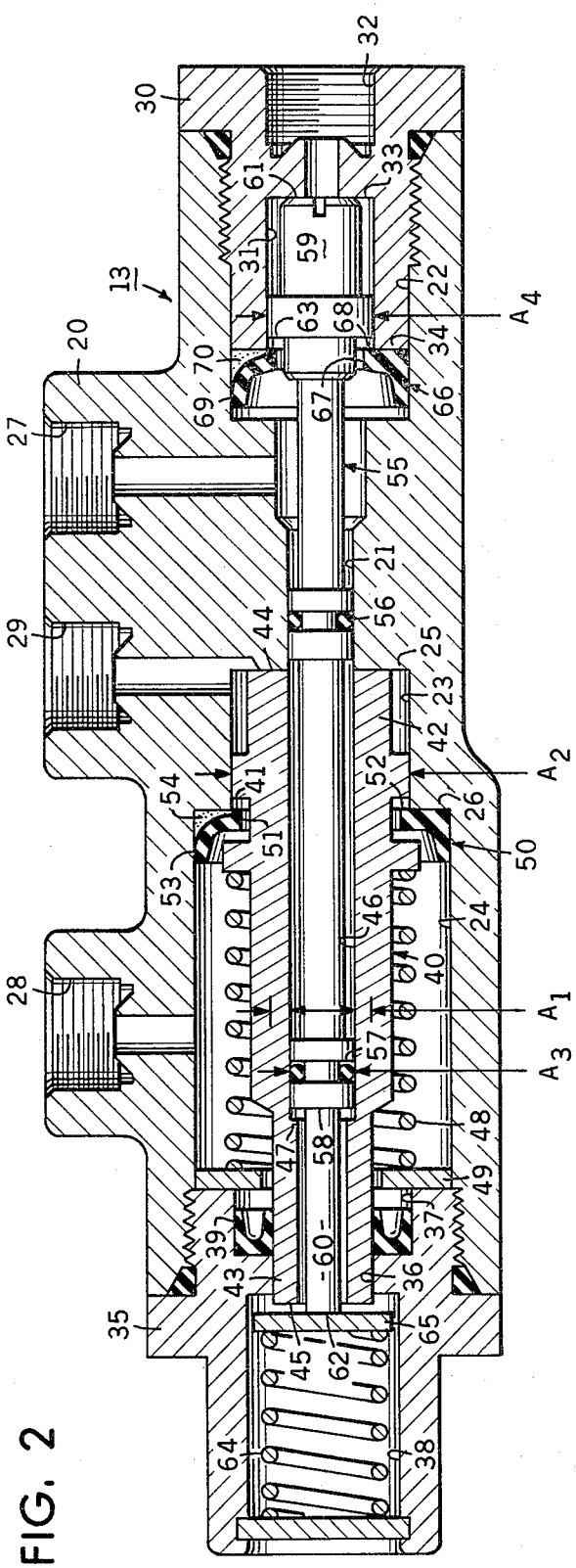
FIG. 2 is a sectional view showing the control valve of FIG. 1 also embodied in the present invention in cross-section.

Referring now to FIG. 2, the control valve 13 is provided with a housing 20 having a bore 21 therein interposed between a counterbore 22 and stepped counterbores 23, 24, and annular shoulders or abutments 25, 26 are provided on said housing between the bore and counterbore 21, 23 and between the stepped counterbores 23, 24, respectively. Inlet ports 27, 28 which respectively receive conduits 14, 17, as previously mentioned, are provided in the housing 20 intersecting with the bore and counterbore 21, 24, respectively, and an outlet port 29 which receives the conduit 18, as previously mentioned, is also provided in said housing intersecting with the counterbore 23. A closure member or plug 30 is threadedly received in the rightward end of the counterbore 22, and an interconnecting bore 31 and outlet port 32 having a shoulder or abutment 33 therebetween are axially provided through said closure member. The outlet port 32 receives the conduit 15, as previously mentioned, and an annular abutment or seat 34 is provided on the interior end of the closure member 30 about the bore 31 thereof, as will be discussed hereinafter. Another closure member 35 is threadedly received in the leftward end of the housing counterbore 24 having a bore 36 axially interposed therein between counterbores 37, 38, and an annular sealing member or cup 39 is connected in sealing engagement with the counterbore 37 about the bore 36.

A metering or proportioning member, such as the piston indicated generally at 40, is provided with an annular valve member 41 thereon interposed between opposed integrally formed extensions 42, 43 having opposed free ends 44, 45, respectively, and a stepped bore 46 having a shoulder or abutment 47 therebetween is axially provided through said piston intersecting with said free ends. The piston extension 42 is slidable in the housing counterbore 23, and the piston extension 43 extends through the seal 39 in sealing engagement therewith and is slidably received in the closure member bore 36 with the free end 45 extending into the closure member counterbore 38. A metering or proportioning spring 48 is pre-compressed in engagement between the proportioning piston 40 and a retainer 49 normally urging said retainer and the proportioning piston free end 44 into abutment with the interior end of the closure member 35 and the housing shoulder 25, respectively, and also normally urging the valve member 41 from engagement with a cooperating seating member 50. The seating member 50 is seated in abutment with the housing shoulder 26 having an aperture 51 therethrough in radially spaced relation with the proportioning piston 40, and a valve seat 52 is defined on said seating member about said aperture for engagement with the proportioning piston valve member 41. The seating member 50 is also provided with an annular lip portion 53 which is normally in sealing engagement with the housing counterbore 24 to close a plurality of return flow passages 54 provided across said seating member.

Another metering or proportioning member, such as the piston indicated generally at 55, is slidably received in the housing and proportioning piston bores 21, 46 having spaced peripheral seals 56, 57 in sealing engagement with said housing and proportioning piston bores, and an annular shoulder or abutment 58 is provided on said piston for cooperative engagement with the shoulder 47 of the piston 40. It should be noted that the piston abutments 47, 58 are normally predeterminately spaced apart to define a lost motion connection for driving engagement between the pistons 40, 55, as discussed hereinafter. Opposed extensions 59, 60 are integrally provided on the proportioning piston 55 having free ends 61, 62 thereon terminating in the closure member bore 31 and the closure member counterbore 38, respectively, and an annular shoulder or valve member 63 is provided on the extension 59. A pre-compressed metering or proportioning spring 64 is provided in the closure member counterbore 38 between the closure member 35 and a spring retainer 65 normally urging said spring retainer into abutment with the free end 62 of the proportioning piston 55 and urging the free end 61 thereof into abutment with the closure member shoulder 33. It should be noted that the engagement of the retainer 65 with the proportioning piston free end 62 predeterminately spaces said retainer from the free end 45 of the proportioning piston 40, and the proportioning spring 65 also urges the valve member 63 from engagement with a cooperating seating member 66. It should be noted that the piston free end 45 and the retainer 65 are normally predeterminately spaced apart to define a lost motion connection for driving engagement between the pistons 40, 55, as discussed hereinafter. The seating member 66 is seated in abutment with the interior end 34 of the closure member 30 having an aperture 67 therethrough in radially spaced relation with the proportioning piston extension 59, and a valve seat 68 is defined on said seating member about said aperture for engagement with the proportioning piston valve member 63. The seating member 66 is also provided with an annular lip portion 69 which is normally in sealing engagement with the housing counterbore 22 to close a plurality of return flow passages 70 provided across said seating member.

An annular effective area $A_1$ is defined on the proportioning piston 40 between the engagement of the closure member seal 39 with the proportioning piston extension 43 and the engagement of the seal 57 with the proportioning piston stepped bore 46, and said area $A_1$ is subjected to atmosphere in the closure member counterbore 38. The seating engagement of the proportioning piston valve member 41 with the seating member valve seat 52 defines another effective area $A_2$ on said proportioning piston which is predeterminately greater than the area $A_1$ and subjected to the fluid pressure at the outlet port 28; therefore, the difference between areas $A_1$, $A_2$ is responsive to the fluid pressure at the inlet port 28. Further, any effective areas on the proportioning piston 55 which is subjected to the fluid pressure at the outlet port 29 are opposed and substantially equal and therefore self-cancelling or balanced. The proportioning piston 55 is provided with an annular effective area $A_3$ defined by the sealing engagement of the seal 57 with the proportioning piston stepped bore 46 and subjected to the atmosphere in the closure member counterbore 38 at all times, and the seating engagement of the proportioning piston valve member 63 with the seating member valve seat 68 defines another effective area $A_4$ on said proportioning piston which is predeterminately greater than the area $A_3$ and subjected to the fluid pressure at the outlet port 32 at all times; therefore, the difference between the areas $A_3$, $A_4$ is responsive to the fluid pressure at the inlet port 27. To complete the description of the control valve 13, it should also be noted that the areas $A_1$, $A_2$ are respectively proportioned to the areas $A_3$, $A_4$.

In the operation with the component parts of the horizontally split brake system 1 and the control valve 13 positioned as described hereinabove and as shown in the drawings, actuation of the split system master cylinder 4 establishes in the separate fluid pressure generating chambers (not shown) thereof substantially equal and separate input or supplied fluid pressures $P_1$, $P_2$ which are respectively transmitted or supplied through conduits 14, 17 to the inlet ports 27, 28 of the control valve 13. The fluid pressure $P_1$ flows from the inlet port 27 through the housing bore and counterbore 21, 22, the aperture 67 of the seating member 66 and the bore 31 of the closure member 30 to establish an output or applied fluid pressure $P_{1o}$ at the outlet port 32 which, of course, is of substantially the same magnitude as the supplied fluid pressure $P_1$. From the outlet port 32 the output fluid pressure $P_{1o}$ flows through the conduit 15 to the split wheel cylinders 5, 6 of the front brakes 7, 8 to effect energization thereof. At the same time, the input fluid pressure $P_2$ flows from the inlet port 28 through the housing counterbore 24, the aperture 51 of the seating member 50 and the housing counterbore 23 to establish an output or applied fluid pressure $P_{2o}$ at the outlet port 29 which is, of course, substantially of the same magnitude as the input fluid pressure $P_2$. From the outlet port 29 the output fluid pressure $P_{2o}$ flows through the conduit 18 to the split wheel cylinders 5a, 6a of the front brakes, 7, 8 to effect energization thereof. The input fluid pressures $P_1$, $P_2$ also respectively flow from conduits 14, 17 through conduits 16, 19 to the split wheel cylinders 9, 10 and 9a, 10a of the rear brakes 11, 12 to effect energization thereof substantially simultaneously with the energization of the front brakes 7, 8.

Figure 3:
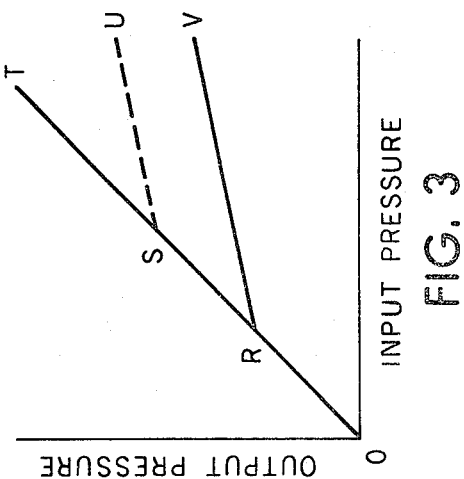
FIG. 3 is a graphical representation of the input and output fluid pressures of the control valve of FIG. 2.

This portion of the braking application is illustrated in the graph of FIG. 3 along the line OR wherein the magnitudes of the fluid pressures $P_1$, $P_2$ and $P_{1o}$, $P_{2o}$ at the respective inlet ports 27, 28 and outlet ports 32, 29 are substantially equal or in a substantially 1:1 ratio and less than the predetermined value R. When the magnitudes of the input and output fluid pressures $P_1$, $P_{1o}$ and $P_2$, $P_{2o}$ are increased to the predetermined value R on the line ORST in the graph of FIG. 3, the output fluid pressures $P_{1o}$, $P_{2o}$ respectively act on the areas $A_3$, $A_1$ to establish closing forces $P_{1o} A_1$, $P_{2o} A_3$ which urge the proportioning pistons 40, 55 leftwardly against the compressive forces $F_{s1}$, $F_{s2}$ of the proportioning springs 64, 48 toward isolating positions to engage the valve members 41, 63 with the seating member valve seats 52, 68 to interrupt pressure fluid communication between the inlet and outlet ports 28, 29 and 27, 32, respectively.

From the graphical representation in the graph of FIG. 3, it is obvious that increases in the magnitudes of the input fluid pressures $P_1$, $P_2$ in excess of the predetermined value R, as illustrated by the line RT in FIG. 3, will result in proportionally reduced increases in the output fluid pressures $P_{1o}$, $P_{2o}$, as illustrated by the line RV. For instance, when the input fluid pressures $P_1$, $P_2$ are increased to a value in excess of the predetermined value R, the input fluid pressures $P_1$, $P_2$ act on the effective input areas $A_4-A_3$, $A_2-A_1$ to establish input forces $P_1(A_4-A_3)$, $P_2(A_2-A_1)$ respectively acting on the proportioning pistons 55, 40 and additive to the spring forces $F_{s1}$, $F_{s2}$ to overcome the output fluid pressures $P_{1o}$, $P_{2o}$ acting on the output areas $A_4$, $A_2$ and establishing opposing output forces $P_{1o}A_4$, $P_{2o}A_2$; therefore, the proportioning pistons 55, 40 are moved rightwardly toward metering or proportioning positions to disengage the valve members 63, 41 from the seating member valve seats 68, 52 and effect metered applications of the increased input fluid pressures $P_1$, $P_2$ through the seating member apertures 67, 51 to effect proportional or ratioed increases in the output fluid pressures $P_{1o}$, $P_{2o}$, as shown by the line RV in the graph of FIG. 3, wherein $$P_{1o} = \frac{P_1(A_4-A_3)+F_{s1}}{A_4}$$

and $$P_{2o} = \frac{P_2(A_2-A_1)+F_{s2}}{A_2}$$

Of course, the increased output fluid pressures $P_{1o}$, $P_{2o}$ in excess of the predetermined value R effects corresponding increases in the output forces $P_{1o}A_4$, $P_{2o}A_2$, and when the increased output forces $P_{1o}A_4$, $P_{2o}A_2$ attain increased values substantially equal to the additive input and spring forces $P_2(A_4-A_3)$, $F_{s1}$ and $P_2(A_2-A_1)$, $F_{s2}$, the proportioning pistons 55, 40 are again moved leftwardly to reposition the valve members 63, 41 thereof in lapped engagement with the seating member valve seats 68, 52 and again isolate the increased input and output fluid pressures $P_1$, $P_{1o}$ and $P_2$, $P_{2o}$, respectively. It is, of course, obvious that the proportioning pistons 55, 40 will be responsive to further increases in the input fluid pressures $P_1$, $P_2$ to effect further proportional increases in the output fluid pressures $P_{1o}$, $P_{2o}$ in the same manner as described above.

When the split system master cylinder 4 is de-actuated, the input fluid pressures $P_1$, $P_2$ are vented to the atmosphere which effects the de-energization of the rear brakes 11, 12 upon the return flow of the fluid pressures $P_1$, $P_2$ from the split wheel cylinders 9, 10 and 9a, 10a through the conduits 16, 14 and 19, 17, respectively, to said master cylinder, and, of course, at the same time the input forces $P_1(A_4-A_3)$, $P_2(A_2-A_1)$ respectively acting on the proportioning pistons 55, 40 are also eliminated. Upon the elimination of the input fluid pressures $P_1$, $P_2$, the output fluid pressures $P_{1o}$, $P_{2o}$ acting on the seating members 66, 50 displace the lips 69, 53 thereof from sealing engagement with the housing counterbores 22, 24 thereby opening the sealing member return flow passages 70, 54, respectively. In this manner, the output fluid pressure $P_{1o}$ returns from the split wheel cylinders 5, 6 of the front brakes 7, 8 through the conduit 15, the outlet port 32 of the control valve 13, the closure member bore 31, the open sealing member return flow passage 70, the housing counterbore 22 and bore 21, the inlet port 27 and the conduit 14 to the master cylinder 4, and at the same time the output fluid pressure $P_{2o}$ returns from the split wheel cylinders 5a, 6a of said front brakes through the conduit 18, the outlet port 29, the housing counterbores 23, 24 and the open seating member return flow passage 54, the inlet port 28, and the conduit 17 to said master cylinder to effect de-energization of said front brakes substantially simultaneously with the aforementioned de-energization of the rear brakes 11, 12. When the output fluid pressures $P_{1o}$, $P_{2o}$ are so reduced to correspondingly effect the reduction of the output forces $P_{1o}A_4$, $P_{2o}A_2$ to a value less than that of the spring forces $F_{s1}$, $F_{s2}$, the springs 64, 48 moves the proportioning pistons 55, 40 toward their original or inoperative positions engaging the piston free ends 61, 44 with the closure member and housing abutments 33, 25 and disengaging the valve members 63, 41 from the seating member valve seats 68, 52 thereby opening the seating member apertures 67, 51 to again establish open pressure fluid communication between the inlet and outlet ports 27, 32 and 28, 29 and effect complete elimination of the output fluid pressures $P_{1o}$, $P_{2o}$, respectively.

In the event of a failure of one of the input fluid pressures $P_1$, $P_2$ due to a malfunction of the master cylinder 4 or leaks or the like in the system 1, it is, of course, desirable to utilize the maximum available remaining fluid pressure to energize the rear brakes 11, 12, and it is also desirable to proportion the fluid pressure applied to effect energization of the front brakes 7, 8 but at another predetermined value S which is predeterminately greater than the predetermined value R, as shown in the graph of FIG. 3. For instance, if the input fluid pressure $P_1$ fails, the proportioning piston 55 will, of course, be inoperative; therefore, the closing force $P_{2o}A_1$ urges the proportioning piston 40 leftwardly against the force $F_{s2}$ of the spring 48 and through the lost motion connection defined between the proportioning piston free end 45 and the spring retainer 65, as previously mentioned, to effect driving engagement therebetween wherein the force $F_{s1}$ of the spring 64 is then additive to the spring force $F_{s2}$ to oppose further concerted leftward movement of said proportioning pistons 40, 55 until the magnitudes of the input and output fluid pressures $P_2$, $P_{2o}$ acting on the proportioning piston 40 attain the predetermined value S. When the input and output fluid pressures $P_2$, $P_{2o}$ attain the predetermined value S, the closing force $P_{2o}A_1$ urges the proportioning piston 40 leftwardly to its isolating position against the additive spring forces $F_{s1}$, $F_{s2}$ to engage the valve member 41 with the valve seat 52. When the input fluid pressure $P_2$ is increased to a value in excess of the predetermined value S, the input force $P_2(A_2-A_1)$ and additive spring forces $F_{s1}$, $F_{s2}$ overcome the opposing output force $P_{2o}A_2$ to urge the proportioning piston 40 rightwardly to its metering position disengaging the valve member 41 from the valve seat 52 and effecting a metered increase in the output fluid pressure $P_{2o}$, as previously described and as shown by the line SU in the graph of FIG. 3 wherein $$P_{2o} = \frac{P_2(A_2-A_1)+F_{s1}+F_{s2}}{A_2}$$

The increased output fluid pressure $P_{2o}$ in excess of the predetermined value S effects a corresponding increase in the output force $P_{2o}A_2$, and when the incerased output force $P_{2o}A_2$ attains an increased value substantially equal to the input force and additive spring forces $P_2(A_2-A_1)$ and $F_{s1}$, $F_{s2}$, the proportioning piston 40 is again moved leftwardly to its isolating position engaging the valve member 41 with the valve seat 52 and isolating the input and output fluid pressures $P_2$, $P_{2o}$. The proportioning piston 40 will, of course, be responsive to further increases in the input fluid pressure $P_2$ to effect further proportional increases in the output fluid pressure $P_{2o}$, as described above, when the input fluid pressure $P_1$ has failed.

Alternatively, in the event of the failure of the input fluid pressure $P_2$, it is obvious that the proportioning piston 40 will be inoperative; therefore, the closing force $P_{1o}A_3$ urges the proportioning piston 55 leftwardly against the force $F_{s1}$ of the spring 64 and through the lost motion connection defined between the shoulder 58 on said proportioning piston 55 with the shoulder 47 on the proportioning piston 40, as previously mentioned, to effect driving engagement therebetween wherein the force $F_{s2}$ of the spring 48 is then additive to the spring force $F_{s1}$ to oppose further concerted leftward movement of said proportioning pistons 40, 55 until the magnitudes of the input and output fluid pressures $P_1$, $P_{1o}$ acting on the proportioning piston 55 attain the predetermined value S. When the input and output fluid pressures $P_1$, $P_{1o}$ attain the predetermined value S, the closing force $P_{1o}A_3$ urges the proportioning piston 55 leftwardly toward its isolating position driving the proportioning piston 40 against the spring force $F_{s2}$ to egage the valve member 63 with the valve seat 68. When the input fluid pressure $P_1$ is increased to a value in excess of the predetermined value S, the input force $P_1(A_4-A_3)$ and additive spring forces $F_{s1}$, $F_{s2}$ overcome the opposing output force $P_{1o}A_4$ to urge the proportioning piston 55 rightwardly to its metering position disengaging the valve member 63 from the valve seat 68 and effecting a metered increase in the output fluid pressure $P_{1o}$, as previously described and as shown by the line SU in the graph of FIG. 3 wherein $$P_{lo} = \frac{P_1(A_4 - A_3) + F_{s1} + F_{s2}}{A_4}$$

The increased output fluid pressure $P_{1o}$ in excess of the predetermined value S effects a corresponding increase in the output force $P_{1o}A_4$ attains an increased value substantially equal to the input force and additive spring forces $P_1(A_4-A_3)$ and $F_{s1}$, $F_{s2}$, the proportioning piston 55 is again moved leftwardly to its isolating position engaging the valve member 63 with the valve seat 68 and isolating the input and output fluid pressures $P_1$, $P_{1o}$. The proportioning piston 55 will, of course, be responsive to further increases in the input fluid pressure $P_1$ to effect further proportional increases in the output fluid pressure $P_{1o}$, as described above, when the input fluid pressure $P_2$ has failed.

From the foregoing, it is now apparent that a novel system 1 and control valve 13 meeting the objects set out hereinbefore, as well as other objects and advantageous features, are provided and that changes or modifications as to the precise configurations, shapes and details of the constructions set forth in the disclosure by way of illustration may be made by those skilled in the art without departing from the spirit of the invention.

The embodiments of the invention in which an exclusive property or privilege is claimed are defined as follows:

1. A control valve comprising a housing, a pair of resiliently urged means movable in said housing for controlling the applications therethrough of separately supplied fluid pressures, said resiliently urged means being initially movably against their own forces in response to supplied and applied fluid pressures of a predetermined value toward positions isolating the supplied and applied fluid pressures and thereafter further movable in response to increases in the supplied fluid pressures and assisted by their own forces toward metering positions effecting metered increases in the applied fluid pressures in a predetermined ratio with the increased supplied fluid pressures, respectively, and means on each of said resiliently urged means for engagement therebetween and defining a lost motion connection, one of said resiliently urged means being actuated against its own force in response to one of the supplied and applied fluid pressures acting thereon upon the failure of the other supplied and applied fluid pressures through the lost motion connection to engage said last named means on said one resiliently urged means with that on the other of said resiliently urged means wherein the respective forces of said resiliently urged means are additive to thereafter oppose actuation of said one resiliently urged means to its isolating position in response to the one supplied and applied fluid pressures in excess of another predetermined value predeterminately in excess of the first named predetermined value and to assist actuation of said one resiliently urged means toward its metering position in response to increases in the one supplied fluid pressure in excess of the other predetermined value to effect the metered increase in the one applied fluid pressure.

2. A control valve according to claim 1, wherein said last named means comprises first and second abutments on said one and other resiliently urged means normally spaced apart to define the lost motion connection, respectively, said first abutment being moved through said lost motion connection into driving engagement with said second abutment upon actuation of said one resiliently urged means and the failure of the other supplied fluid pressure.

3. A control valve according to claim 2, wherein said resiliently urged means include a pair of proportioning members, and a pair of resilient means engaged with said proportioning members, the forces of said resilient means opposing actuation of said proportioning members toward their isolating positions in response to the first named predetermined value of the supplied and applied fluid pressures and assisting actuation of said proportioning members toward their metering positions, and said first and second abutments being on said proportioning members, respectively, one of said proportioning members being actuated against the force of one of said resilient means through the lost motion connection to engage said first abutment with said second abutment wherein the respective forces of said resilient means are additive to thereafter oppose actuation of said one proportioning member to its isolating position in response to the other predetermined value of the one supplied and applied fluid pressures and assist actuation of said one proportioning member toward its metering position upon the failure of the other supplied and applied fluid pressures.

4. A control valve according to claim 3, comprising a part of abutment means respectively in said resiliently urged means and defining another lost motion connection for engagement therebetween, the other of said proportioning members being actuated against the force of the other of said resilient means through said other lost motion connection in response to the other of the supplied and applied fluid pressures acting thereon upon the failure of the one supplied and applied fluid pressures to engage one of said abutment means with other thereof wherein the respective forces of said one and other resilient means are additive to thereafter oppose actuation of said other proportioning member to its isolating position in response to the other supplied and applied forces of the other predetermined value and assist actuation of said other proportioning member toward its metering position in response to increases in the other supplied fluid pressure in excess of the other predetermined value to effect the metered increase in the other applied fluid pressure.

5. A control valve according to claim 4, wherein said one proportioning member includes extension means extending coaxially through said other proportioning member, said first abutment being on said extension means, and said one resilient means including a spring and a retainer, said spring being biased between said housing and retainer urging said retainer into engagement with said extension means, and said retainer defining said other abutment means, said one abutment means being engaged with said other abutment means to disengage said retainer from said extension means upon the actuation of said other proportioning member toward its isolating position against the additive forces of said other resilient means and said spring means.

6. A control valve according to claim 3, wherein said one proportioning member includes extension means extending coaxially through said other proportioning member, said one resilient means being engaged with said extension means.

7. A control valve according to claim 1, comprising other means on each of said resiliently urged means for engagement therebetween and defining another lost motion connection, said other resiliently urged means being actuated against its own force through said other lost motion connection to engage said other means thereof with that of said one resiliently urged means in response to the other supplied fluid pressure acting thereon wherein the respective forces of said resiliently urged means are additive to thereafter oppose actuation of said other resiliently urged means in response to the other supplied fluid pressure in excess of the other predetermined value for varying the magnitude of the other applied fluid pressure upon the failure of the one supplied fluid pressure.

8. A control valve comprising a housing having a pair of inlet and outlet ports therein, a pair of proportioning members movable in said housing for controlling pressure fluid communication between said inlet and outlet ports, respectively, a pair of spring means respectively engaged with said proportioning members, said proportioning members being movable against the forces of said spring means in response to fluid pressures of a predetermined value at said inlet and outlet ports toward positions interrupting pressure fluid communication therebetween and being thereafter further movable in response to increases in the fluid pressures at said inlet ports and assisted by the forces of said spring means toward metering positions establishing metered pressure fluid communication between said inlet and outlet ports to effect metered increases in the fluid pressures at said outlet ports in predetermined ratios with the increased fluid pressures, respectively, and a pair of abutment means on said proportioning members for engagement and normally spaced apart to define a predetermined lost motion travel between said proportioning members, one of said proportioning members being actuated through said lost motion travel to engage one of said abutment means with the other of said abutment means in response to the fluid pressure at one of said inlet and outlet ports wherein the respective forces of said spring means are additive to thereafter oppose movement of said one proportioning member to its pressure fluid communication interrupting position in response to fluid pressure at said one inlet and outlet ports of another predetermined value predeterminately greater than the first named predetermined value and to assist movement of said one proportioning member toward its metering position in response to increases in the fluid pressure at said one inlet port in excess of the other predetermined value to effect the metered increase in the fluid pressure at said one outlet port upon the failure of the fluid pressure at the other of said inlet ports.

9. A control valve according to claim 8, comprising a pair of valve seats in said housing between said inlet and outlet ports, and a pair of valve means on said proportioning members for engagement with said valve seats, said valve means being moved into engagement with said valve seats upon actuation of said proportioning members to their isolating positions and being disengaged from said valve seats upon actuation of said proportioning members to their metering positions, respectively.

10. A control valve according to claim 8, wherein said one proportioning member includes extension means extending coaxially through said other proportioning member, said one spring means being engaged with said extension means.

11. A control valve according to claim 10, comprising a free end portion on said extension means, said one spring means comprising a spring having opposed ends, and a retainer for said spring, said spring having one end engaged with said housing and the other end thereof engaged with said retainer urging said retainer into engagement with the free end portion of said extension means, and third and fourth abutment means in said other proportioning member and said retainer and normally spaced apart defining another predetermined lost motion travel therebetween, said other proportioning member being actuated against the force of said other spring means in response to the fluid pressures at said other inlet and outlet ports acting thereon through said other lost motion travel upon the failure of the fluid pressures at said one inlet and outlet ports to engage said third abutment means with said fourth abutment means wherein the force of said spring is additive to the force of said other spring means to thereafter oppose actuation of said other proportioning member to its isolating position in response to the fluid pressures at said other inlet and outlet ports of the other predetermined value and assist actuation of said other proportioning member toward its metering position in response to increases in the fluid pressure at said other inlet port in excess of the other predetermined value to effect the metered increase in the fluid pressure at said other outlet port.

12. In a dual fluid pressure brake system having a separate fluid pressure supply for each system and each system including at least one fluid pressure responsive motor for energizing a brake, a pair of modulating means for said systems and operable generally in response to separately supplied fluid pressures in excess of a predetermined value to perform fluid modulating operations thereon and thereby vary the pressure applied to said brake motors, respectively, and said modulating means each including means for engagement therebetween and defining a lost motion connection, one of said modulating means being actuated in response to one of the supplied fluid pressures through said lost motion connection to engage its included means with that of the other of said modulating means and said other modulating means being thereafter concertedly movable with said one modulating means in response to the one supplied fluid pressure in excess of another predetermined value predeterminately in excess of said first named predetermined value acting thereon to perform the fluid modulating operation on said one supplied fluid pressure and thereby vary the pressure applied to one of said brake motors upon the failure of the other of said supplied fluid pressures.

13. In a dual fluid pressure brake system having a separate fluid pressure supply for each system and each system including at least one fluid pressure responsive motor for energizing a brake, a pair of resiliently urged means movable in response to the supplied fluid pressures in excess of a predetermined value for altering the magnitudes thereof applied to said motors, respectively, and said resiliently urged means each including means for driving engagement therebetween and defining a lost motion connection, one of said resiliently urged means being actuated against its own force through said lost motion connection to drivingly engage its included means with that of the other of said resiliently urged means wherein the forces of said resiliently urged means are additive to thereafter oppose the concerted movement of said other resiliently urged means with said one resiliently urged means in response to the one supplied fluid pressure in excess of another predetermined value predeterminately in excess of the first named predetermined value acting thereon for altering the magnitude of the one supplied fluid pressure applied to one of said motors upon the failure of the other of the supplied fluid pressures.

14. In a dual hydraulic brake system having a separate hydraulic pressure supply for each system and each system including at least one pressure responsive motor for energizing a brake, a pair of proportioning valves for said systems with said proportioning valves being actuated generally for reducing the pressures to the motors of said systems, respectively, a pair of spring means respectively engaged with said proportioning valves and opposing actuation thereof at pressures less than a predetermined value, and a pair of abutment means respectively on said proportioning valves for driving engagement therebetween and normally spaced apart to define a lost motion connection, one of said proportioning valves being actuated in response to the pressure of the supply in one of said systems to move one of said abutment means through said lost motion connection into driving engagement with the other of said abutment means on the other of said proportioning valves wherein the respective forces of said spring means are thereafter additive to oppose concerted actuation of said proportioning valves in response to the pressure of the supply in said one system less than another predetermined value in excess of the first named predetermined value acting on said one proportioning valve to effect the actuation thereof to reduce the pressure to the motor of said one system upon the failure of the other of said systems.

15. A control valve comprising a housing, a pair of proportioning members relatively and concertedly movable in said housing for performing proportioning operations on separate fluid pressures supplied thereto, said proportioning members being relatively movable in response to the separate supplied fluid pressures in excess of a predetermined value acting thereon to effect the applications through said housing of separate proportionally reduced fluid pressures, and a pair of means on said proportioning members for engagement therebetween in the event of the failure of one of the supplied fluid pressures and defining a lost motion connection, respectively, one of said proportioning members being relatively movable in response to the other of the supplied fluid pressures in excess of the predetermined value acting thereon to engage one of said means with the other of said means and establish the lost motion connection upon the failure of the one supplied fluid pressure acting on the other of said proportioning members, and said other proportioning member being thereafter concertedly movable with said one proportioning member in response to the other supplied fluid pressure in excess of another predetermined value greater than the first named predetermined value acting thereon to perform its proportioning function on the other supplied fluid pressure.

References Cited
UNITED STATES PATENTS

| | | | |
|---|---|---|---|
| 3,441,318 | 4/1969 | Bueler | 303—6 C |
| 3,450,443 | 6/1969 | Bueler | 303—6 C |
| 3,467,440 | 9/1969 | Strien | 303—6 C |

MILTON BUCHLER, Primary Examiner

J. J. McLAUGHLIN, Assistant Examiner

U.S. Cl. X.R.

137—87; 188—349; 303—84 A